United States Patent
Yong et al.

(10) Patent No.: US 10,135,890 B2
(45) Date of Patent: Nov. 20, 2018

(54) LATENCY-DEPENDENT CLOUD INPUT CHANNEL MANAGEMENT

(71) Applicant: Sony Interactive Entertainment LLC, San Mateo, CA (US)

(72) Inventors: Kelvin Yong, Irvine, CA (US); Bryan Cotta, Laguna Hills, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 14/640,506

(22) Filed: Mar. 6, 2015

(65) Prior Publication Data

US 2016/0261656 A1    Sep. 8, 2016

(51) Int. Cl.
*H04L 12/859* (2013.01)
*H04L 29/06* (2006.01)
*H04L 12/26* (2006.01)
*H04L 7/10* (2006.01)

(52) U.S. Cl.
CPC ........ *H04L 65/4069* (2013.01); *H04L 43/087* (2013.01); *H04L 63/0428* (2013.01); *H04L 69/08* (2013.01)

(58) Field of Classification Search
None
See application file for complete search history.

(56) References Cited

U.S. PATENT DOCUMENTS

| | | | |
|---|---|---|---|
| 6,731,600 B1* | 5/2004 | Patel | H04L 43/062 370/230 |
| 8,140,646 B2* | 3/2012 | Mickens | G06F 17/30902 709/203 |
| 8,144,837 B2* | 3/2012 | Guedalia | G06Q 30/0241 379/133 |
| 8,189,487 B1* | 5/2012 | Mateski | H04L 69/22 370/242 |
| 8,930,979 B2* | 1/2015 | Tidwell | H04N 21/25833 725/109 |
| 2002/0120727 A1* | 8/2002 | Curley | H04L 41/12 709/223 |
| 2006/0136570 A1 | 6/2006 | Pandya | |
| 2009/0064248 A1* | 3/2009 | Kwan | H04L 12/1868 725/109 |
| 2011/0044199 A1 | 2/2011 | Kazmi et al. | |

(Continued)

FOREIGN PATENT DOCUMENTS

| CA | 2723628 A1 | 2/2010 |
|---|---|---|
| WO | 2011147339 A1 | 12/2011 |

OTHER PUBLICATIONS

International Search Report and Written Opinion for International Application No. PCT/US2016/21056, dated May 20, 2016.

(Continued)

*Primary Examiner* — Venkat Perungavoor
(74) *Attorney, Agent, or Firm* — JDI Patent; Joshua Isenberg; Robert Pullman

(57) ABSTRACT

Aspects of the present disclosure relate to systems and methods for establishing an assistance output that takes into account client device latency information and sending the assistance output from the server to the client device. Client device information or the assistance output may include a stream of encrypted data packets.

32 Claims, 3 Drawing Sheets

(56) References Cited

U.S. PATENT DOCUMENTS

| | | | | |
|---|---|---|---|---|
| 2012/0188233 | A1* | 7/2012 | Shuster | G06T 15/20 |
| | | | | 345/419 |
| 2013/0013671 | A1 | 1/2013 | Relan et al. | |
| 2013/0080641 | A1 | 3/2013 | Lui et al. | |
| 2013/0091266 | A1* | 4/2013 | Bhave | G06F 11/3476 |
| | | | | 709/224 |
| 2014/0179436 | A1* | 6/2014 | Karamfilov | A63F 13/12 |
| | | | | 463/32 |
| 2014/0189091 | A1* | 7/2014 | Tamasi | H04L 43/0858 |
| | | | | 709/224 |
| 2014/0359120 | A1* | 12/2014 | Jung | H04L 67/22 |
| | | | | 709/224 |

OTHER PUBLICATIONS

Office Action dated Nov. 15, 2017 for Taiwan Patent Application No. 105103328
Extended European Search Report for Application No. 16762260.4 PCT/US2016021056, dated Jul. 5, 2018.

* cited by examiner

LATENCY-DEPENDENT CLOUD INPUT CHANNEL MANAGEMENT

FIELD

The present disclosure relates to data transport over a network. In particular, aspects of the present disclosure relate to systems and methods for reducing the effects of latency experienced between a server configured to operate on a network and a client device.

BACKGROUND

With the increasing prevalence of digital streaming services and various cloud-based computing solutions, the ability to quickly and accurately transfer large amounts of data between remote devices is a critical task. Sending digital data to a destination system through shared resources of a network, such as the internet, a wide area network (WAN), or local area network (LAN), typically involves the arrangement of data into formatted blocks, known as packets, which may have fixed or variable length. Each data packet typically includes a payload, or body, which has the fundamental client data being delivered to the destination, as well as certain supplemental information used for routing and control purposes, which commonly contained at least partially within a header of the data packet. Broadly speaking, the network, sending systems, and receiving systems may use this supplemental information to ensure proper routing and delivery of the payload to the intended destination.

However, digital streaming services and cloud-based computing solutions may experience limitations in the quality and bandwidth of networks established or used during the transfer of data between remote devices when utilizing applications that are sensitive to latencies, such as video games. These limitations may lead to delays in the data transmission and can thus cause latency, which typically creates inconsistencies during the use of an application. While client devices will attempt to achieve the lowest latency through a variety of methods, inevitably, each client device will experience a different amount of latency due to differences in factors such as the decode speed of transmitted data, render rates, input polling, or even the client's network connection.

Additionally, an often unavoidable consequence of transporting data over a packet switched network is packet loss, which occurs when one or more data packets fail to properly reach their destination. Packet loss can arise due to a variety of factors, including channel congestion, signal degradation, and other reasons. In order to prevent certain network conditions which cause packet loss to occur, while also efficiently using the available bandwidth in a network channel, a variety of congestion control techniques have been developed. Moreover, there are a range of transport protocols which may incorporate tools to handle packet loss, and the particular method used to handle packet loss when it does occur depends on the particular transport protocol used during data transfer. Generally speaking, these transport protocols can be classified under two types, reliable protocols and unreliable protocols, which each present certain tradeoffs, and the particular choice of protocol used in any instance may depend on the nature of the data transfer.

Reliable protocols incorporate guarantees that each data packet is delivered to its destination in sequence, retransmitting dropped packets in the event of packet loss. Reliable protocols are often, but not always, connection-oriented protocols and delivery guarantees are typically accomplished by establishing a backchannel from the recipient back to the sender for a particular communication session, which the recipient may use to send some type of acknowledgement receipts to verify that packets were delivered properly. The sender may use these acknowledgments to guide the retransmission process when it is indicated that data packets failed to properly reach their destination. A prevalent and well-known example of a reliable protocol is Transmission Control Protocol (TCP), which is also connection-oriented. Reliable protocols, such as TCP, are well suited to tasks where accurate transfer of data is a chief concern and some amount of delay can be tolerated in the interests of verifying data packets are delivered properly, such as sending text based emails, digital content downloads, and media streaming services in which audio/video can be buffered at the destination system. Unfortunately, the data verification properties and retransmission of data introduces a comparatively large overhead, rendering many reliable protocols undesirable for time-critical applications, including real-time data transfer, such as live audio and/or video streaming, online video gaming, and internet telephony.

Unreliable protocols, by contrast, generally forgo the type of data delivery verifications for particular packets as described above, and are generally characterized by the fact that they do not guarantee that each packet reaches its destination, nor do they ensure that the packets are delivered in the proper sequence. Unreliable protocols are often, but not always, connectionless, and typically do not establish a fixed channel during any particular communication session. Each data packet may instead be routed independently based on the supplemental information contained in each data packet. A prevalent and well-known example of an unreliable protocol is User Datagram Protocol (UDP), which is also connectionless. Since unreliable protocols like UDP have comparatively reduced overhead by forgoing the reliability properties mentioned above, they are better suited for time sensitive applications where minimizing latency is a chief concern, such as the real-time applications mentioned above.

Importantly, network conditions often vary over time, causing the maximum bitrate available to a sender over a network channel to vary based on present load on the channel. When a sender system attempts to send data packets at a bitrate that exceeds the current available bandwidth of the channel, it can cause congested conditions which trigger severe packet loss in response. This might be tolerable in less time-sensitive applications involving reliable data transport such as TCP, since retransmission of the lost data is guaranteed; however, this may be unacceptable in many real-time applications and other applications involving unreliable transport, as the packet loss may be to such an extent that the recipient is unable to reconstruct the loss data, causing undesirable consequences such as dropout of the signal. On the other hand, when the maximum available bitrate instead far exceeds the bitrate offered by the sender, this is also undesirable, as the full transmission capabilities of the network channel are inefficiently utilized, and the quality of the signal at the recipient side may be unnecessarily poor as a result.

Unfortunately, it is a significant challenge to transfer data using an unreliable protocol in a way that efficiently utilizes the available bandwidth of a network channel without causing congested conditions that result in unacceptable packet loss. Traditional congestion control techniques are often only suitable for reliable protocols, such as TCP, which have feedback to the sender built in to the transport layer, but are ineffective for many unreliable protocols, such as UDP, which typically lack the needed feedback unless independently added over the transport layer by the client. Moreover, congestion control or congestion avoidance algorithms designed for TCP or other reliable protocols are generally not fast real-time streaming applications or and may be unsuitable for many data transfer applications involving unreliable protocols, as the exponential reduction in bitrate in response to congestion may cause the quality of a real-time signal to suffer too much as a result. Moreover, while packet loss resulting from increasing the bitrate to the point of congestion might be tolerable in less time-sensitive applications, which use TCP or other reliable protocols to retransmit the data, it may be unacceptable in many real-time applications due to a resulting inability of the recipient to reconstruct the data.

Accordingly, there is a need in the art to find alternative means for reducing a client's unique latency constraints, which are also suitable for use with UDP and other unreliable transport protocols when the data being transferred is encrypted. It is within this context that aspects of the present disclosure arise.

SUMMARY

In accordance with certain implementations of the present disclosure, a method performed on a server configured to operate on a network may include receiving client device information from a client device with the server via a network connection. The client device information may include latency data. The method may include determining an assistance output that takes into account the client device latency information. The method may also include sending the assistance output from the server to the client device. The client device information or the assistance output may include a stream of encrypted data packets.

In accordance with certain implementations of the present disclosure, a sender computing system may include at least one processor unit, and at least one memory unit coupled to the at least one processor unit. The at least one processor unit and the at least one memory unit may be configured to perform a method. The method may include receiving client device information from a client device with the server via a network connection. The client device information may include latency data. The method may include determining an assistance output that takes into account the client device latency information. The method may also include sending the assistance output from the server to the client device. The client device information or the assistance output may include a stream of encrypted data packets.

In accordance with certain implementations of the present disclosure, a non-transitory computer readable medium may contain computer readable instructions embodied therein. The computer readable instructions may be configured to implement a method when executed. The method may receiving client device information from a client device with the server via a network connection. The client device information may include latency data. The method may include determining an assistance output that takes into account the client device latency information. The method may also include sending the assistance output from the server to the client device. The client device information or the assistance output may include a stream of encrypted data packets.

BRIEF DESCRIPTION OF THE DRAWINGS

The teachings of the present disclosure can be readily understood by considering the following detailed description in conjunction with the accompanying drawings, in which.

DETAILED DESCRIPTION

Although the following detailed description contains many specific details for the purposes of illustration, anyone of ordinary skill in the art will appreciate that many variations and alterations to the following details are within the scope of the invention. Accordingly, the illustrative implementations of the present disclosure described below are set forth without any loss of generality to, and without imposing limitations upon, the claimed invention.

Introduction

Aspects of the present disclosure relate to systems and methods for reducing the effects of latency experienced between a server configured to operate on a network and a client device.

In accordance with certain aspects, one or more servers configured to operate on a network may receive client device information from one or more client devices with the server via a network connection. The client device information may include latency data. The one or more servers may determine an assistance output that takes into account the client device latency information.

The server may also send the assistance output from the server to the client device. The client device information or the assistance output may include a stream of encrypted data packets.

Further Details

Figure 1:
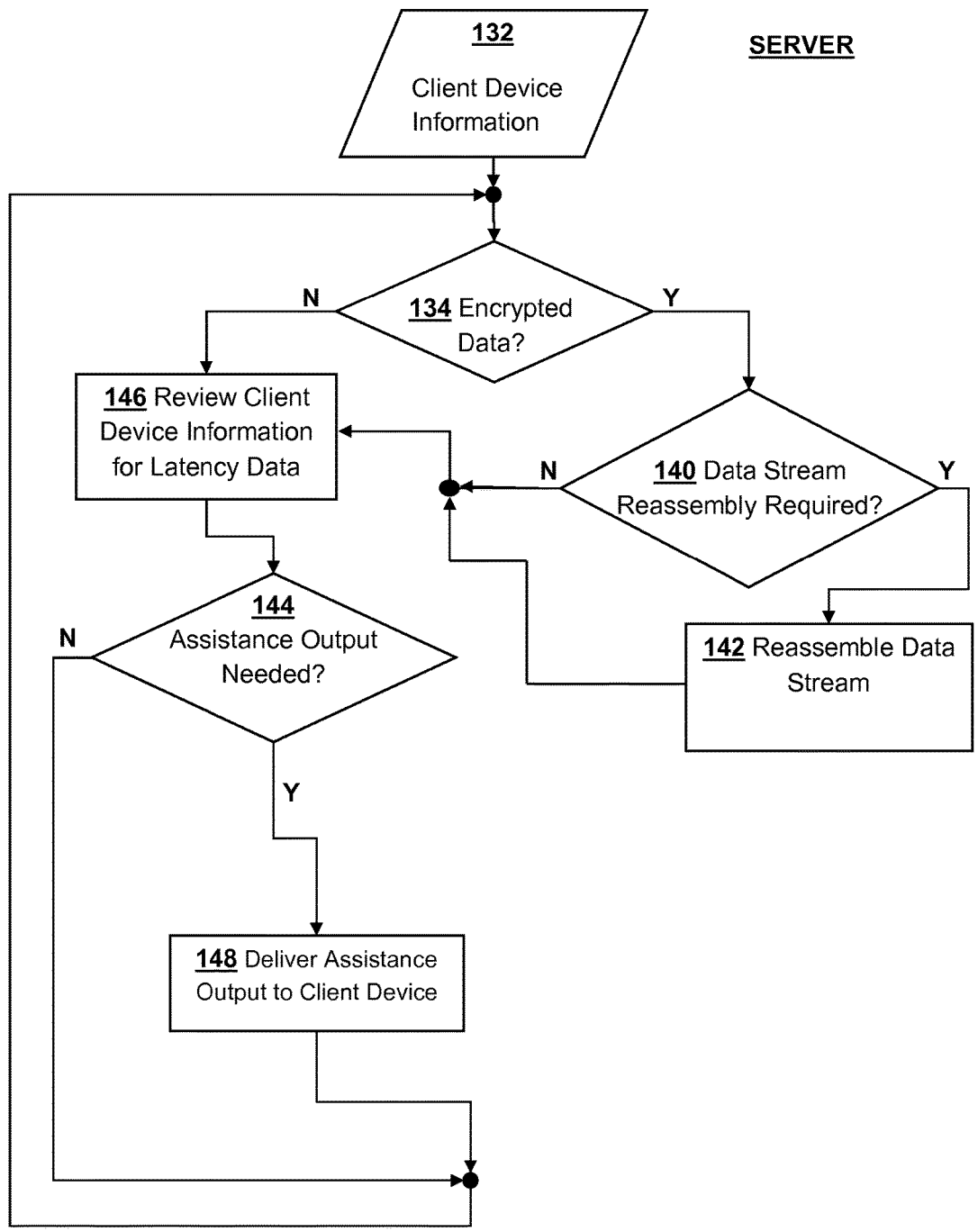
FIG. 1 is flow diagram of an example assistance output technique from the client device side in accordance with certain aspects of the present disclosure.

Turning now to FIG. 1, an illustrative example of how an assistance output may be provided to a client device in response to received client device latency data according to certain aspects of the present disclosure are depicted. In particular, FIG. 1 depicts an example process flow for providing a client device with an assistance output in response to received client device latency data, in accordance with certain implementations of the present disclosure. It is noted that the example method of providing assistance output in FIG. 1 may have one or more aspects in common with the methods indicated in FIGS. 2 and 3. It is also important to note that the example of FIG. 1 is only a simplified example for purposes illustrating only certain aspects of how an assistance output may be provided in accordance with the present disclosure.

At the outset, it is important to note that in this example, an assistance output is provided to a client device that is experiencing latency. However, in alternative implementations, assistance output may be sent or triggered under other circumstances. As shown in FIG. 1, how the assistance output 148 is provided in response to Client Device Information 132 that is received by the server from one or more client devices may generally depend on whether or not the client device information 132 indicates that latency is present, as indicated at 146.

In accordance with certain aspects, where client device information 132 indicates that the client device is experiencing latency 146, the server may determine that an assistance output 144 should be provided to the client device in order to assist the user in overcoming the effects of the latency. This may be illustrated by the following example. Say data is being transmitted between the device and the server over a network that is experiencing jitter (e.g., variation in latency as measured in the variability over time of the packet latency across a network). Once this jitter has been detected by the client device, the client device may report to the server that it is experiencing latency 146. Upon receiving this information, the server may determine that the severity of the latency requires an assistance output be provided to or implemented by the client device 144. The type of assistance output may depend on the severity of the latency. Accordingly, as an example of one possibility of an assistance output 148, the server may then provide assistance instructions to the client device. Alternatively, the instructions may be preloaded on the client device or stored elsewhere and the server may send a trigger signal that causes the client device to execute pre-loaded instructions or obtain instructions from elsewhere and execute them. Such instructions may be in the form of a script. As used herein, and as is generally understood by those skilled in the art, a "script" refers to a program written for a special run-time environment that can interpret (rather than compile) and automate the execution of tasks that could alternatively be executed one-by-one by a human operator. In implementations where the assistance instructions are already loaded on the client device, the assistance output 148 may be a signal that triggers the client device to implement preloaded assistance instructions. The signal may contain information that indicates the amount of latency so that the client device may select appropriate assistance to execute depending on the degree of latency.

Whether pre-loaded on the client device, sent to the client from the server, or obtained by the client from elsewhere, the assistance instructions may take many different forms. By way of example, and not by way of limitation, some input combinations from the client device involve several button presses and the buttons must be pressed within 16 ms of each other. An assisted input script could map this combination of button presses down to a single button press.

In another example of an assistance output 148, the server may provide or trigger assistance instructions for the client device to record the time difference ($\Delta T$) between user inputs. Assuming the next three inputs by the user are three button presses in the sequence square, square, circle; each input is 16 ms apart. Due to the network jitter, however, the server receives these inputs as square, square, circle, with the lag between the first and second input at 16 ms and the lag between the second and third input at 33 ms. However, by executing the assistance output instructions (e.g., script) the client device may record the $\Delta T$ between inputs has been executed and send them to the server. Thus, in addition to the inputs, the server also receives the data regarding the $\Delta T$ input at the client device. Accordingly, the server then inputs the user commands with the appropriate $\Delta T$ of 16 ms between each input, as opposed to input timing as originally received by the server.

In some implementations, the client device may automatically record the $\Delta T$ between inputs that have been executed and send them to the server as part of the client device information 132. The server can then compare the $\Delta T$ values received from the client device to differences in time of arrival of the inputs at the server (e.g., by taking the difference) and determine the latency. The server may then use the determined latency to select an appropriate assistance output 148.

In accordance with certain aspects, client device information may also be sent via encrypted data packets 134. As shown in FIG. 1, the server may receive a stream of encrypted data 134 via a secure or unsecure network (for example, UDP). If the encrypted data stream is received out of order, traditional methods such as Forward Error Correction (FEC) would need to be implemented in order properly decrypt the data stream. In accordance with certain aspects of the present disclosure, however, if the server determines that the data stream requires reassembly 140 due to out-of-sequence transmission, the server may use the header information included with each packet in order to maintain the proper decryption order and reassemble the data stream before decryption, as shown in 142.

It is emphasized that the example technique depicted in FIG. 1 is provided for purposes of illustration only, in order to highlight certain aspects of the present disclosure. In practice, implementations of the present disclosure may factor in additional or alternative considerations not depicted by the example of FIG. 1, and may be more complex than the simplified scheme depicted in FIG. 1.

It will be appreciated from the example of FIG. 1 that certain aspects of the present disclosure include various methods of assistance output which may be provided to the client device. This may be by way of altering a modality of user experience with the client device. This may also be by way of providing a variety of scripts to the client device. In one embodiment scripts may be configured to reduce the difficulty of an artificial intelligence asset engaging the user. In another embodiment the scripts may be configured to present a different scene to the user. In either case, the assistance output allows the user to overcome the effects of latency. It will also be appreciated from the example of FIG. 1 that certain aspects of the present disclosure include various data streams to be encrypted and decrypted through the usage of packet header information. Accordingly, data sent from the server to the client device may also be encrypted, and the client device may use encrypted packet header information to establish the appropriate decryption order for the data stream received.

Figure 2:
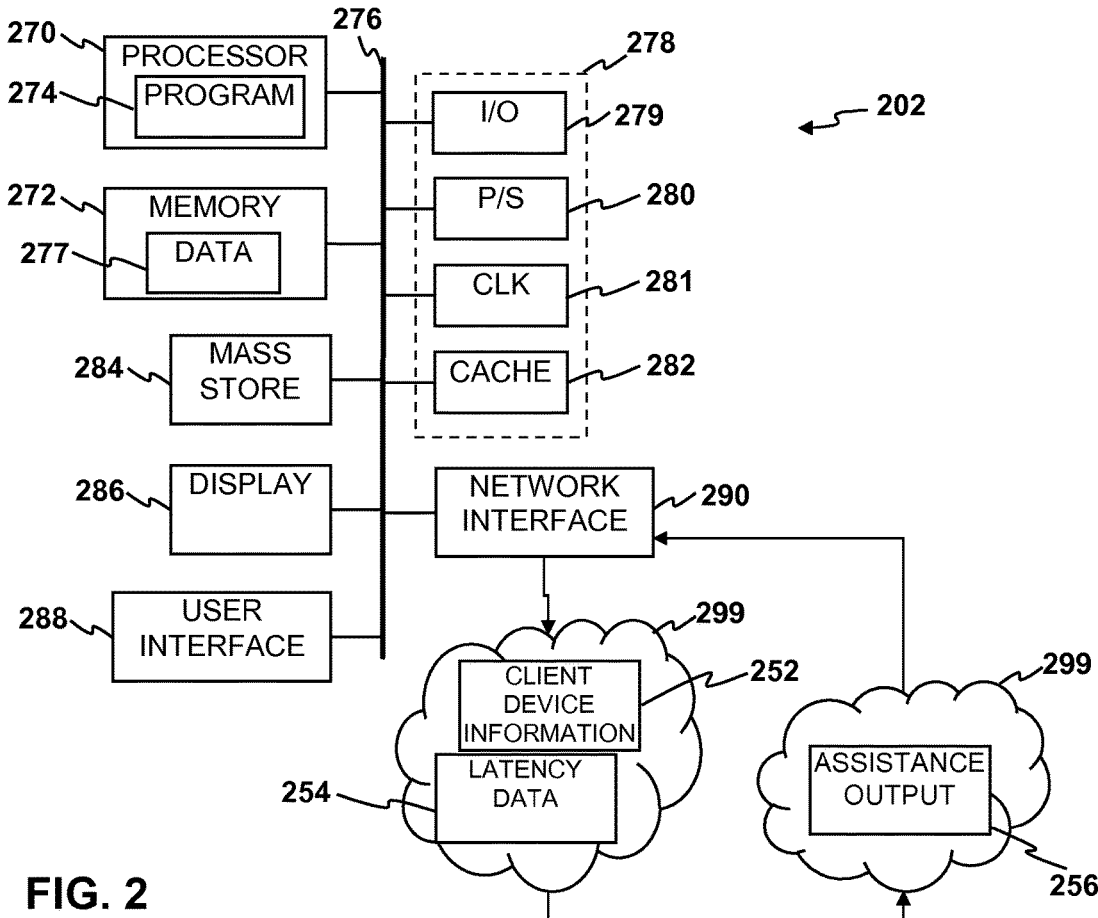
FIG. 2 is a block diagram of an example system in accordance with certain aspects of the present disclosure.
Figure 2:
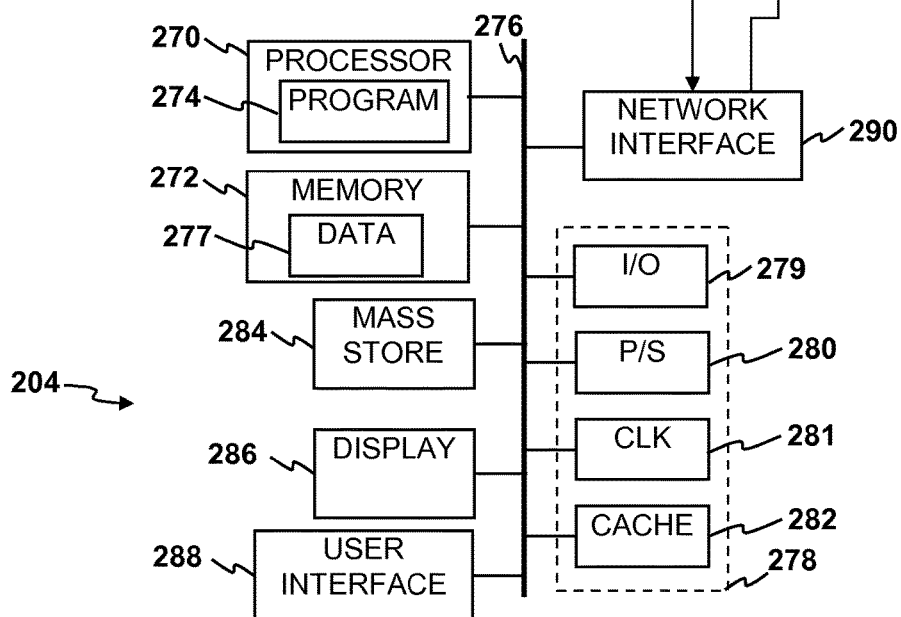

Certain implementations of aspects of the present disclosure include systems configured for assistance output. By way of example, and not by way of limitation, FIG. 2 depicts a distributed computing system that includes at least one server computing system 202 and at least one client device computing system 204, and the computing systems 202 and 204 are configured to transfer data over a network in accordance with certain aspects of the present disclosure. In certain implementations, the server 202 may be configured to execute instructions that have one or more aspects in common with those described with respect to FIG. 1 and/or FIG. 4. In certain implementations, the client device 204 may be configured to execute instructions that have one or more aspects in common with one or more of those described above with respect to FIG. 1 or below with respect to FIG. 3. Either or both the server 202 and client device 204 may be configured with suitable software and/or hardware to implement various aspects of the methods described herein. Either or both the server 202 and client device 204 may be a server, an embedded system, mobile phone, personal computer, laptop computer, tablet computer, portable game device, workstation, game console, wearable device such as a smart watch, and the like.

In accordance with certain implementations, the server 202 may be a cloud computing server, and the client device 204 may be a cloud computing client of the server 202, and the client server 202 may be configured to provide a data stream to the client device over a network 299 using an unreliable protocol. By way of example, and not by way of limitation, either the server 202 or the client device 204 may be a computing system that is configured to provide a real-time data stream, such as a real-time audio stream, a real-time video stream, or a real-time audio/video stream to the at least one server 202 or at least one client device 204 over a network 299, which may be a wide area network (WAN) such as the internet. The computing system (either server 202 or client device 204) may be configured to send data over the network in the form of encrypted data packets containing the data being delivered to the recipient system. For example, the client device 204 may send these encrypted packets concurrently to the recipient device 202 in accordance with various aspects of the present disclosure. The recipient system 202 may decrypt the encrypted data packets, and the encrypted data packets may include a header that indicates a place in the decryption order for the packet.

Either of the systems 202 and 204 (i.e., server 202, client device 204, or both) may include one or more processor units 270, which may be configured according to well-known architectures, such as, e.g., single-core, dual-core, quad-core, multi-core, processor-coprocessor, cell processor, and the like. Either of the systems 202 and 204 may also include one or more memory units 272 (e.g., RAM, DRAM, ROM, and the like). The processor unit 270 may execute one or more programs 274, which may be stored in the memory 272, and the processor 270 may be operatively coupled to the memory 272, e.g., by accessing the memory via a data bus 276. The memory unit 272 may include data 277, and the processor unit 270 may utilize the data 277 in implementing the program 274. The data 277 for either of the systems 202 and 204 may include, e.g., assistance output data 256 transmitted from the server 202 to the client device 204, and client device information 252 optionally including client device latency data 254 from the client device 204 to the server 202 or vice versa according to various aspects of the present disclosure.

Figure 3:
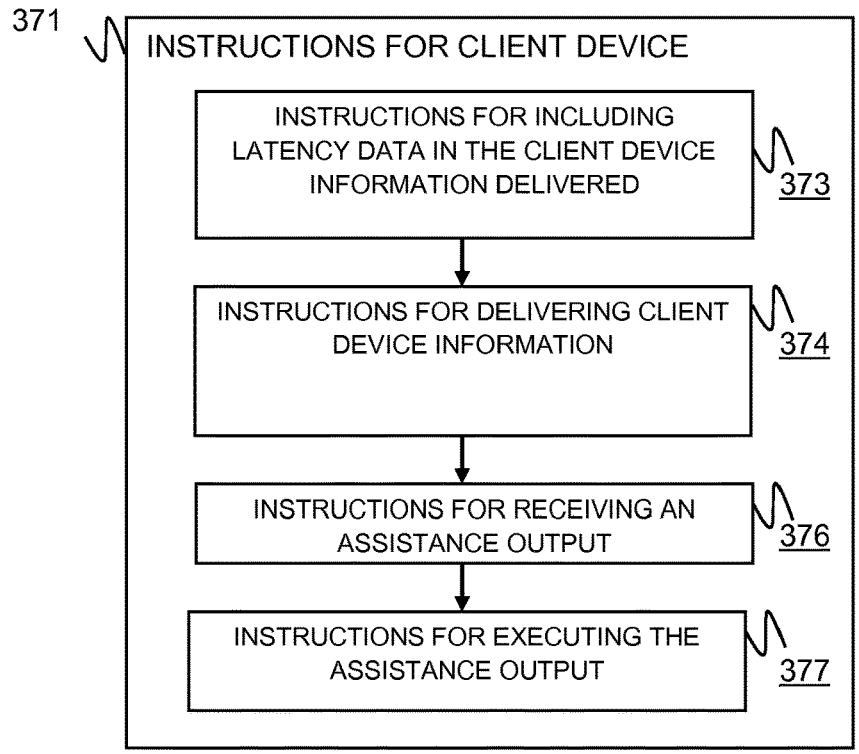
FIG. 3 is a flow diagram of an example assistance output technique from the client side in accordance with certain aspects of the present disclosure.

The program 274 may include optionally instructions that, when executed by a processor, perform one or more operations associated with decryption of packets over an unsecure network or delivery of an assistance output 256, such as, e.g., a method having one or more features in common with the methods of FIGS. 1, 3, and/or 4. For example, the program 274 of the server 202 may include instructions that, when executed by the processor 270, cause the server to send data to the at least one recipient device 204 and/or provide an assistance output 256 in response to latency data 254 from the client device 204, in accordance with aspects of the server side of the method depicted in FIG. 1 and/or the sending of client device latency data. The program 274 of the client device 204 may include instructions that, when executed by the processor 270, cause the client device to execute the assistance output instructions 256 that are either pre-loaded or provided by the server 202.

Either of the systems 202 and 204 may also include well-known support circuits 278, such as input/output (I/O) circuits 279, power supplies (P/S) 280, a clock (CLK) 281, and cache 282, which may communicate with other components of the system, e.g., via the bus 276. Either of the systems 202 and 204 may optionally include a mass storage device 284 such as a disk drive, CD-ROM drive, tape drive, flash memory, or the like, and the mass storage device 284 may store programs and/or data. Either of the systems 202 and 204 may also optionally include a display unit 286. The display unit 286 may be in the form of a cathode ray tube (CRT), flat panel screen, touch screen, or other device that displays text, numerals, graphical symbols, or other visual objects. Either of the systems 202 and 204 may also include a user interface 288 to facilitate interaction between the system 202/204 and a user. The user interface 288 may include a keyboard, mouse, light pen, game control pad, touch interface, or other device. The user interface may also include an audio I/O device, such as a speaker and/or microphone.

A user may interact either of the computer systems through the user interface 288. By way of example, the server may 202 may be a cloud gaming server, and the client device 204 may be a cloud gaming client, and a video game user may interact with a video game executed by the server 202 and streamed to the client 204 through the user interface 288. The rate at which data is transmitted from the server to the client may be optimized in accordance with aspects of the present disclosure to enhance the experience for the user and maintain the quality of a signal received at the client side. Portions of the user interface 288 may include a graphical user interface (GUI) that can be displayed on the display unit 286 in order to facilitate user interaction with the system 202/204. The system 202/204 may include a network interface 290, configured to enable the use of Wi-Fi, an Ethernet port, or other communication methods. The network interface 290 may incorporate suitable hardware, software, firmware or some combination thereof to facilitate communication via a telecommunications network, and may support data transport using an unreliable protocol in accordance with certain aspects of the present disclosure. The network interface 290 may be configured to implement wired or wireless communication over local area networks and wide area networks such as the Internet. Either of the systems 202 and 204 may send and receive data and/or requests for files via one or more data packets 299 over a network.

As shown in FIG. 3, a set of client device platform instructions 371 may be implemented, e.g., by the client device platform 204. The client device platform instructions 371 may be formed on a nontransitory computer readable medium such as the memory 272 or the mass storage device 284. The client device platform instructions 371 may also be part of the process control program 274. As indicated at 373 the client device platform instructions 371 may include instructions for determining latency data 254 to be included client device information 252 to be sent to the server 202. The instructions 371 may include instructions 374 for delivering client device information 252 to the server 202. If the client device information 252 is to be sent in the form of encrypted packets, these latter instructions may optionally include instructions that insert packet encryption order information into packet headers so that the server 202 can decrypt the packets even if they are received out of order. Thereafter, at 376 the instructions may include instructions for receiving an assistance output 356 and subsequently may include instructions for executing assistance instructions triggered by or included in the received assistance output 256. If the assistance output 256 is to be received in the form of encrypted packets, these latter instructions may optionally include instructions that extract packet encryption order information from packet headers so that the client device 204 can decrypt the packets even if they are received out of order.

Figure 4:
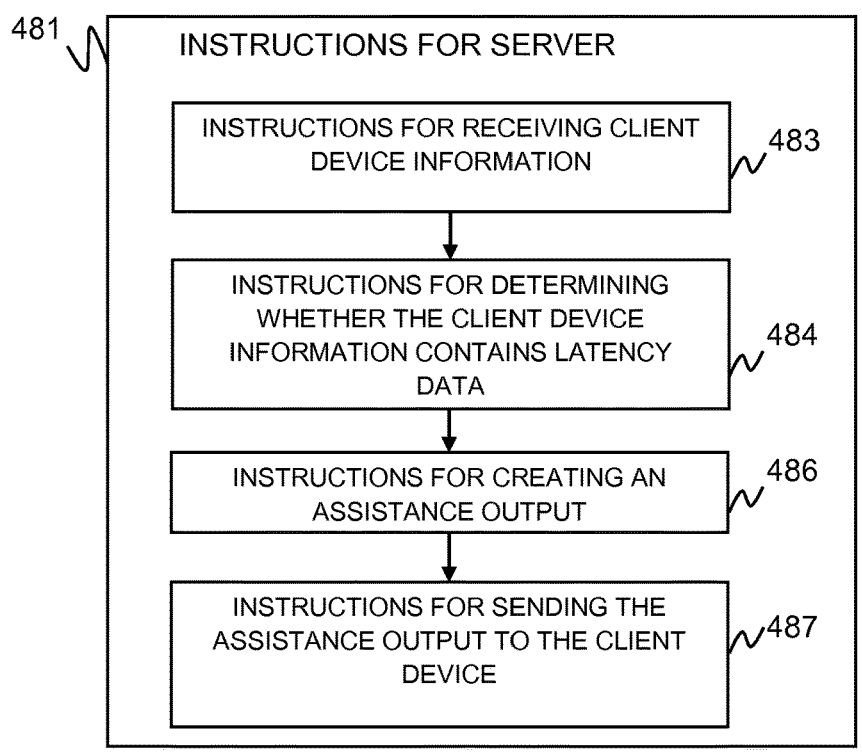
FIG. 4 is a flow diagram of an example assistance output technique from the server side in accordance with certain aspects of the present disclosure.

As shown in FIG. 4, a set of server instructions 481 may be implemented, e.g., by the server 202. The server instructions 481 may be formed on a nontransitory computer readable medium such as the memory 272 or the mass storage device 284. The server instructions 481 may also be part of the process control program 274. As indicated at 483, the instructions 481 may include instructions for receiving client device information 252 from the client device 204. If the client device information 252 is received in the form of encrypted packets, these latter instructions may optionally include instructions that retrieve packet encryption order information from packet headers so that the server 202 can decrypt the packets even if they are received out of order. Thereafter, at 484, the instructions may include instructions for determining whether the client device information 252 contains latency data 254. Furthermore, as indicated at 486, if latency data 254 is received with the client device information 252, the instructions 481 may contain instructions for creating an assistance output 256 to be delivered to the client device 204. Thereafter, at 487, the instructions may include instructions for sending the assistance output 256 to the client device 204. If the assistance output 256 is to be sent in the form of encrypted packets, these latter instructions may optionally include instructions that insert packet encryption order information into packet headers so that the client device 204 can decrypt the packets even if they are received out of order.

The above components may be implemented in hardware, software, firmware, or some combination thereof.

While the above is a complete description of the various illustrative implementations of the present disclosure, it is possible to use various alternatives, modifications and equivalents. Therefore, the scope of the present invention should not be construed to be limited by the above description but should, instead, be determined with reference to the appended claims, along with their full scope of equivalents. Any feature described herein, whether preferred or not, may be combined with any other feature described herein, whether preferred or not. In the claims that follow, the indefinite article "a", or "an" refers to a quantity of one or more of the item following the article, except where expressly stated otherwise. The appended claims are not to be interpreted as including means-or-step-plus-function limitations, unless such a limitation is explicitly recited in a given claim using the phrase "means for" or "step for."

What is claimed is:

1. In a server configured to operate on a network, a method, comprising:
    receiving client device information from a client device with the server via a network connection, wherein the client device information includes client latency data;
    determining an assistance output that takes into account the client latency data including a measurement of time between user inputs, wherein determining the assistance output includes utilizing the input time measurements to implement the inputs with the server using the same input time measurements with which the inputs were generated at the client device, wherein determining the assistance output comprises at least choosing the appropriate assistance output based on client latency data, wherein the assistance output is configured to alter a modality of user experience with the client device; and
    sending the assistance output from the server to the client device, wherein the assistance output allows the user to overcome the effects of latency.

2. The method of claim 1, wherein the assistance output contains a signal that triggers execution of assistance instructions already loaded on the client device.

3. The method of claim 1, wherein the assistance output contains instructions to be executed on the client device.

4. The method of claim 2, wherein the instructions are scripts.

5. The method of claim 3, wherein the scripts are configured to aid the user in the completion of a task.

6. The method of claim 1, wherein the modality is altered by allowing more time for user input.

7. The method of claim 1, wherein the modality is altered by reducing a difficulty level of an artificial intelligence asset engaging the user.

8. The method of claim 1, wherein the modality is altered by presenting a different scene to the user.

9. The method of claim 1, wherein the client device information or the assistance output includes a stream of encrypted data packets.

10. The method of claim 9, wherein each data packet in the stream of encrypted data packets includes a header that indicates a place in a decryption order for the packet.

11. The method of claim 10, further comprising using the decryption order of the encrypted packets to reassemble the data stream with the server when the packets are received out of order.

12. The method of claim 9, wherein the stream of data packets is sent via an unreliable protocol.

13. The method of claim 12, wherein the unreliable protocol is User Datagram Protocol (UDP).

14. A system comprising:
    a processor, and
    a memory coupled to the processor;
    wherein the processor is configured to perform a method, the method comprising:
        receiving client device information from a client device with a server via a network connection, wherein the client device information includes client latency data;
        determining an assistance output that takes into account the client latency data, wherein determining the assistance output comprises at least choosing the appropriate assistance output based on client latency data including a measurement of time between user inputs, wherein determining the assistance output includes utilizing the input time measurements to implement the inputs with the server using the same input time measurements with which the inputs were generated at the client device, wherein the assistance output is configured to alter a modality of user experience with the client device; and
    sending the assistance output from the server to the client device, wherein the assistance output allows the user to overcome the effects of latency.

15. The system of claim 14, wherein the client device information or the assistance output includes a stream of encrypted data packets.

16. A non-transitory computer readable medium having processor-executable instructions embodied therein, wherein execution of the instructions by a processor causes the processor to implement a method, the method comprising:
    receiving client device information from a client device with a server via a network connection, wherein the client device information includes client latency data determining an assistance output that takes into account the client latency data, wherein determining the assistance output comprises at least choosing the appropriate assistance output based on client latency data including a measurement of time between user inputs, wherein determining the assistance output includes utilizing the input time measurements to implement the inputs with the server using the same input time measurements with which the inputs were generated at the client device, wherein the assistance output is configured to alter a modality of user experience with the client device; and sending the assistance output from the server to the client device, wherein the assistance output allows the user to overcome the effects of latency.

17. The non-transitory computer readable medium of claim 16, wherein the client device information or the assistance output includes a stream of encrypted data packets.

18. A method comprising:
sending client device information from a client device to a server via a network connection, wherein the client device information includes client latency data
receiving an assistance output from the server wherein the assistance output takes into account the client latency data including a measurement of time between user inputs, wherein the assistance output is chosen based at least on the client latency data, wherein choosing the assistance output includes utilizing the input time measurements to implement the inputs with the server using the same input time measurements with which the inputs were generated at the client device, wherein the assistance output is configured to alter a modality of user experience with the client device; and
implementing assistance corresponding to the assistance output with the client device, wherein the assistance output allows the user to overcome the effects of latency.

19. The method of claim 18, wherein the assistance output contains a signal that triggers execution of assistance instructions already loaded on the client device.

20. The method of claim 18, wherein the assistance output contains instructions to be executed on the client device.

21. The method of claim 19, wherein the instructions are scripts.

22. The method of claim 20, wherein the scripts are configured to aid the user in the completion of a task.

23. The method of claim 18, wherein the modality is altered by allowing more time for user input.

24. The method of claim 18, wherein the modality is altered by reducing a difficulty level of an artificial intelligence asset engaging the user.

25. The method of claim 18, wherein the modality is altered by presenting a different scene to the user.

26. The method of claim 18, wherein the client device information or the assistance output includes a stream of encrypted data packets.

27. The method of claim 26, wherein each data packet in the stream of encrypted data packets includes a header that indicates a place in a decryption order for the packet.

28. The method of claim 27, further comprising using the decryption order of the encrypted packets to reassemble the data stream with the server when the packets are received out of order.

29. The method of claim 26, wherein the stream of data packets is sent via an unreliable protocol.

30. The method of claim 29, wherein the unreliable protocol is User Datagram Protocol (UDP).

31. A system comprising:
a processor, and
a memory coupled to the processor;
wherein the processor is configured to perform a method, the method comprising:
sending client device information from a client device to a server via a network connection, wherein the client device information includes client latency data
receiving an assistance output from the server wherein the assistance output takes into account the client device latency information including a measurement of time between user inputs, wherein the assistance output is chosen based at least in part on the client latency information, wherein choosing the assistance output includes utilizing the input time measurements to implement the inputs with the server using the same input time measurements with which the inputs were generated at the client device, wherein the assistance output is configured to alter a modality of user experience with the client device; and
implementing assistance corresponding to the assistance output with the client device, wherein the assistance output allows the user to overcome the effects of latency.

32. A non-transitory computer readable medium having processor-executable instructions embodied therein, wherein execution of the instructions by a processor causes the processor to implement a method, the method comprising:
sending client device information from a client device to a server via a network connection, wherein the client device information includes client latency data
receiving an assistance output from the server wherein the assistance output takes into account the client device latency information including a measurement of time between user inputs, wherein the assistance output is chosen based at least on the client latency information, wherein choosing the assistance output includes utilizing the input time measurements to implement the inputs with the server using the same input time measurements with which the inputs were generated at the client device, wherein the assistance output is configured to alter a modality of user experience with the client device; and
implementing assistance corresponding to the assistance output with the client device, wherein the assistance output allows the user to overcome the effects of latency.

* * * * *